(12) United States Patent
Jordan et al.

(10) Patent No.: US 7,343,474 B1
(45) Date of Patent: Mar. 11, 2008

(54) MINIMAL ADDRESS STATE IN A FINE GRAIN MULTITHREADED PROCESSOR

(75) Inventors: Paul J. Jordan, Austin, TX (US); Robert T. Golla, Round Rock, TX (US); Jama I. Barreh, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

(21) Appl. No.: 10/881,616

(22) Filed: Jun. 30, 2004

(51) Int. Cl.
*G06F 9/30* (2006.01)
(52) U.S. Cl. .................................................. 712/214
(58) Field of Classification Search ................. 712/214
See application file for complete search history.

(56) References Cited

U.S. PATENT DOCUMENTS

| | | | |
|---|---|---|---|
| 5,046,068 A | 9/1991 | Kubo et al. | |
| 5,187,791 A * | 2/1993 | Baum .......................... | 710/268 |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,619,439 A | 4/1997 | Yu et al. | |
| 5,954,789 A | 9/1999 | Yu et al. | |
| 6,016,532 A * | 1/2000 | Lynch et al. ................. | 711/118 |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,212,544 B1 | 4/2001 | Borkenhagen et al. | |
| 6,282,554 B1 | 8/2001 | Abdallah et al. | |
| 6,308,319 B1 * | 10/2001 | Bush et al. .................. | 717/141 |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,397,239 B2 | 5/2002 | Oberman et al. | |
| 6,415,308 B1 | 7/2002 | Dhablania et al. | |

(Continued)

OTHER PUBLICATIONS

Hennessy, John, Patterson, David. "Computer Architecture: A Quantitive Approach" Morgan Kaufmann, third edition, pp. 113-114 and A23-A26.*

(Continued)

*Primary Examiner*—Richard L. Ellis
*Assistant Examiner*—Jacob Petranek
(74) *Attorney, Agent, or Firm*—Lawrence J. Merkel; Meyertons, Hood, Kivlin, Kowert & Goetzel, P.C.

(57) ABSTRACT

In one embodiment, a processor comprises a plurality of pipeline stages and a first circuit operable at a first pipeline stage of the plurality of pipeline stages. The first circuit is configured to maintain a plurality of program counters (PCs), each of which corresponds to one of a plurality of threads that the processor is configured to have concurrently in process with respect to the plurality of pipeline stages. The first circuit is configured to provide a first PC to a second pipeline stage of the plurality of pipeline stages. The first PC is derived from one of the plurality of PCs that corresponds to a first thread of the plurality of threads, and a first instruction entering the second pipeline stage is from the first thread.

30 Claims, 9 Drawing Sheets

U.S. PATENT DOCUMENTS

| | | | |
|---|---|---|---|
| 6,427,196 B1 | 7/2002 | Adiletta et al. | |
| 6,434,699 B1 | 8/2002 | Jones et al. | |
| 6,470,443 B1 * | 10/2002 | Emer et al. | 712/205 |
| 6,496,925 B1 | 12/2002 | Rodgers et al. | |
| 6,507,862 B1 | 1/2003 | Joy et al. | |
| 6,523,050 B1 | 2/2003 | Dhablania et al. | |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,728,845 B2 | 4/2004 | Adiletta et al. | |
| 6,748,556 B1 | 6/2004 | Storino et al. | |
| 6,789,184 B1 | 9/2004 | Singh et al. | |
| 6,801,997 B2 | 10/2004 | Joy et al. | |
| 6,820,107 B1 | 11/2004 | Kawai et al. | |
| 6,847,985 B1 | 1/2005 | Gupta et al. | |
| 6,851,045 B2 * | 2/2005 | Holmann et al. | 712/234 |
| 6,857,064 B2 | 2/2005 | Smith et al. | |
| 6,880,072 B1 * | 4/2005 | Giles | 712/244 |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |

OTHER PUBLICATIONS

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Stimultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

Alverson et al., "Tera Hardware-Software Cooperation," Tera Computer Company, 1997, (16 pages).

Alverson et al., "The Tera Computer System," Tera Computer Company, 1990, (pp. 1-6).

Alverson et al., "Exploiting Heterogeneous Parallelism on a Multithreaded Multiprocessor," Tera Computer Company, 1992, (pp. 188-197).

Smith et al., "The End of Architecture," 17th Annual Symposium on Computer Arcitecture, Seattle, Washington, May 29, 1990, (pp. 10-17).

Ungerer et al., "A Survey of Processors with Explicit Multithreading," ACM Computing Surveys, vol. 35, No. 1, Mar. 2003, (pp. 29-63).

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

Fig. 3

| DCTI? | Taken? | Annul? | A | Exception? | PC | NPC | A |
|---|---|---|---|---|---|---|---|
| N | - | - | 0 | - | NPC | NPC+4 | 0 |
| N | - | - | 1 | - | PC | NPC | 0 |
| Y | N | N | 0 | N | NPC | NPC+4 | 0 |
| Y | N | N | 1 | N | NPC | NPC+4 | 1 |
| Y | N | Y | 0 | N | NPC+4 | NPC+8 | 0 |
| Y | N | Y | 1 | N | NPC+4 | NPC+8 | 1 |
| Y | Y | N | 0 | N | NPC+4 | Target | 1 |
| Y | Y | N | 1 | N | NPC | Target | 1 |
| Y | Y | Y | 0 | N | NPC | Target | 0 |
| Y | Y | Y | 1 | N | PC | Target | 0 |
| Y | - | - | 0 | Y | NPC | NPC+4 | 0 |
| Y | - | - | 1 | Y | PC | NPC | 0 |

Fig. 5

| | | TLU Values for Thread, When Instruction Reaches Writeback | | |
|---|---|---|---|---|
| PC | Instruction | PC | NPC | A |
| 1000 | I0 | 1000 | 1004 | 0 |
| 1004 | DCTI, Tgt=2000 | 1008 | 2000 | 1 |
| 1008 | DCTI, Tgt=3000 | 2000 | 3000 | 1 |
| ⋮ | | | | |
| 2000 | DCTI, Tgt=4000 | 3000 | 4000 | 1 |
| ⋮ | | | | |
| 3000 | I1 | 3000 | 4000 | 0 |
| ⋮ | | | | |
| 4000 | I2 | 4000 | 4004 | 0 |
| 4004 | I3 | 4004 | 4008 | 0 |

Fig. 6

MINIMAL ADDRESS STATE IN A FINE GRAIN MULTITHREADED PROCESSOR

BACKGROUND

1. Field of the Invention

This invention is related to the field of processors and, more particularly, to multithreaded processors and maintaining program counters (PCs) for instructions in processor such as multithreaded processors.

2. Description of the Related Art

In a typical processor, the PC of each instruction in the pipeline is tracked in some fashion. The PC may be used by some instructions during execution, such as relative control transfer instructions which calculate a target address using the PC of the relative control transfer instruction and one or more operands of the relative control transfer instruction. Additionally, the PC is needed to provide for precise interrupts/exceptions in a processor. That is, if an instruction experiences an interrupt/exception during execution, the PC of the instruction is used to identify the instruction for the interrupt/exception handler. As address spaces increase in size (e.g. greater than 32 bits, in many current processors) the amount of storage allocated to track the PC of each instruction increases.

Some processor instruction set architectures (ISAs) define delayed control transfer instructions (DCTIs). A control transfer instruction may transfer program execution flow (either conditionally or unconditionally) to a target address. A DCTI transfers execution after the next instruction in the program flow (subsequent to the DCTI). The subsequent instruction is said to be in the delay slot of the DCTI. Typically, processors that implement an ISA that includes DCTIs track, for each instruction, both the PC of that instruction and the PC of the next instruction (the NPC) to facilitate delay slot handling. If a DCTI is taken (transferring program execution flow to the target address), the DCTI may update the NPC of the delay slot instruction. Thus, processors need only be able to locate the delay slot instruction of the DCTI to update the program counters when both the PC and the NPC are tracked. However, tracking both the PC and the NPC of each instruction increases the amount of storage allocated for PCs.

In fine grain multithreaded processors, each instruction in the pipeline may be from a different thread than adjacent instructions in the pipeline. That is, for a given instruction is a given pipeline stage, instructions in a pipeline stage immediately before and after the given pipeline stage may be from different threads. Accordingly, the PC and NPC of each instruction may typically be transported down the pipeline of the processor. Furthermore, any buffering that may be implemented within the pipeline requires storage for both the PC and the NPC of each instruction (or restrictions on the contents of the buffers in the presence of DCTIs in the buffers and logic to properly propagate PCs/NPCs through the buffers).

SUMMARY

In one embodiment, a processor comprises a plurality of pipeline stages and a first circuit operable at a first pipeline stage of the plurality of pipeline stages. The first circuit is configured to maintain a plurality of program counters (PCs), each of which corresponds to one of a plurality of threads that the processor is configured to have concurrently in process with respect to the plurality of pipeline stages. The first circuit is configured to provide a first PC to a second pipeline stage of the plurality of pipeline stages. The first PC is derived from one of the plurality of PCs that corresponds to a first thread of the plurality of threads, and a first instruction entering the second pipeline stage is from the first thread.

In another embodiment, a processor comprises a plurality of pipeline stages and a first circuit operable at a first pipeline stage of the plurality of pipeline stages. The first circuit is configured to maintain at least one program counter (PC) corresponding to a thread being processed by the processor. At least one of the plurality of pipeline stages excludes a PC of the instruction in that pipeline stage.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

FIG. 5 is a table illustrating operation of one embodiment of the trap logic unit for PC/NPC update.

FIG. 6 is an example instruction sequence illustrating one embodiment of PC management.

Figure 1:
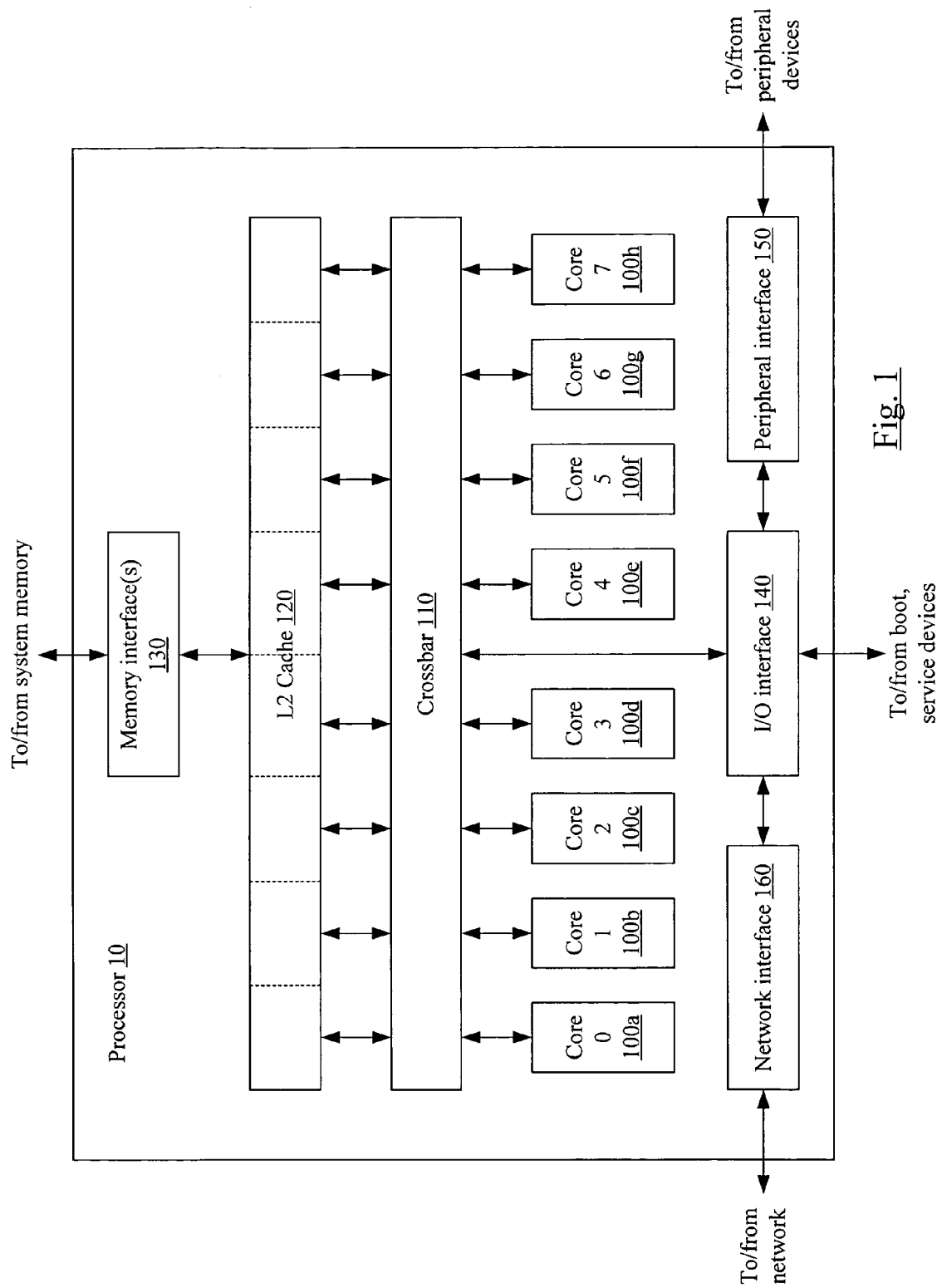
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
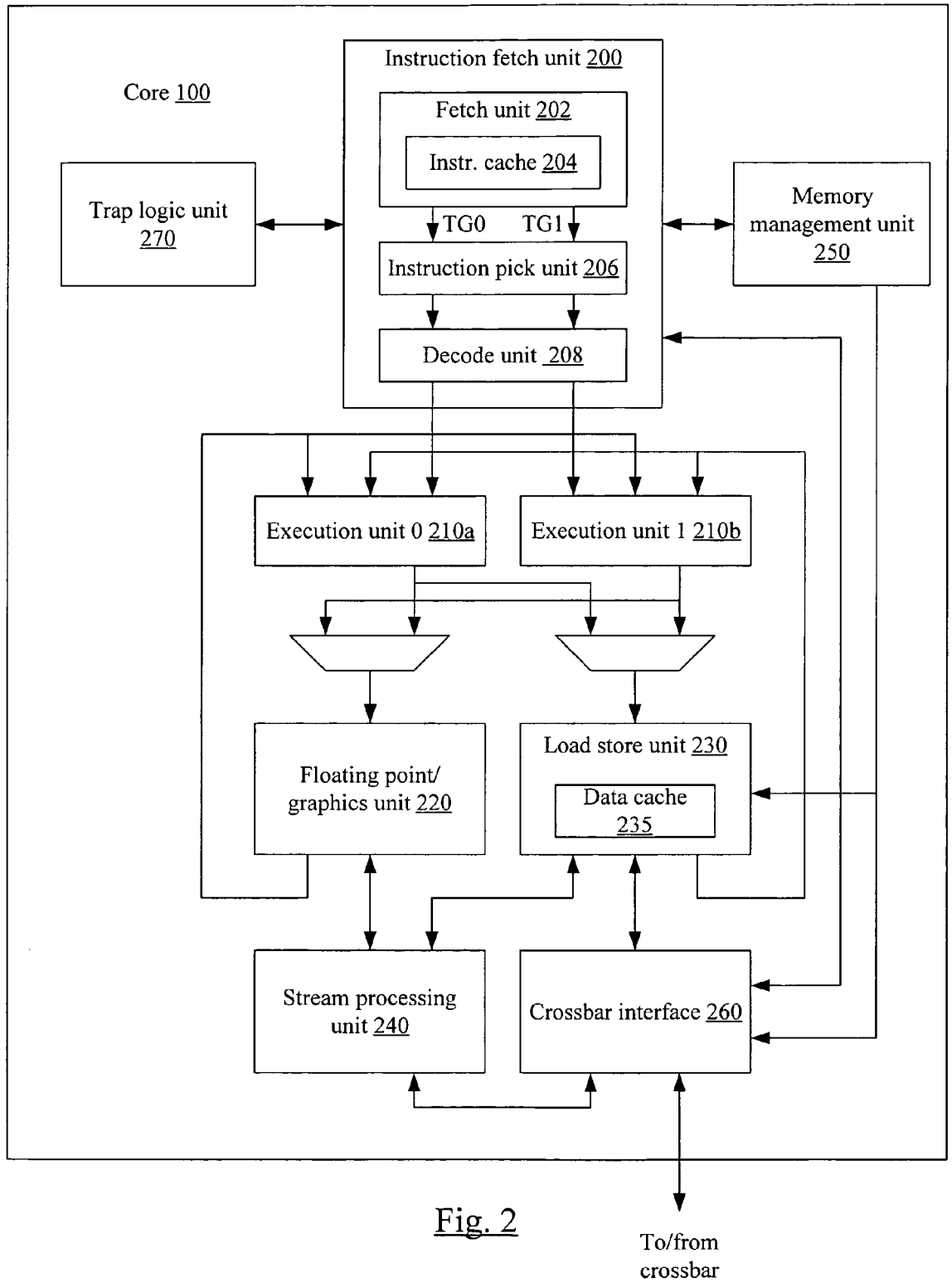
FIG. 2 is a block diagram of one embodiment of a core shown in FIG. 1.

FIGS. 1-3 present an overview of a multithreaded processor 10 that may implement the PC management circuitry described in more detail below. In other embodiments, the PC management circuitry may be implemented in other multithreaded or non-multithreaded processors, as desired.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

PC Management

Turning next to FIGS. 4-8, one embodiment of the processor 10 (and more particularly a core 100 within the processor 10) is shown in which a select pipeline stage is defined to be the stage at which per-thread PCs are maintained. The pipeline stage may provide PCs to other pipeline stages as needed, deriving the PC for the instruction at the other pipeline stage based on the PC(s) for the thread that the instruction is from. In some embodiments, one or more of the pipeline stages in the pipeline may eliminate PCs. That is, one or more pipeline stages may exclude storage for a PC of the instruction at that pipeline stage.

In particular, in one embodiment, the stage at which instructions complete may be selected to maintain the per-thread PCs. In the illustrated embodiment, the stage is writeback, although other embodiments may have differing stages. Generally, an instruction may be completed if its result is committed to architected state in the processor. In some embodiments, managing the PCs at one pipeline stage and supplying PCs, as needed, to other pipeline stages may reduce the amount of storage implemented for managing PCs (and may reduce the attendant circuitry for managing the PCs in the storage).

As used herein, the PC of an instruction may be any representation of the address at which the instruction is stored. The PC may be a virtual address or a physical address, in various embodiments. The PC may also be a partial address. For example, in fixed-length instruction sets, one or more of the least significant bits of the PC may be known to be zero and may not be stored (except where visible to software, in which case the PC is stored in the format defined in the ISA). Additionally, in some cases, it may be possible to represent the PC using part of the address (e.g. the in-page portion of the address while storing the remainder of the address elsewhere, etc.).

Figure 4:
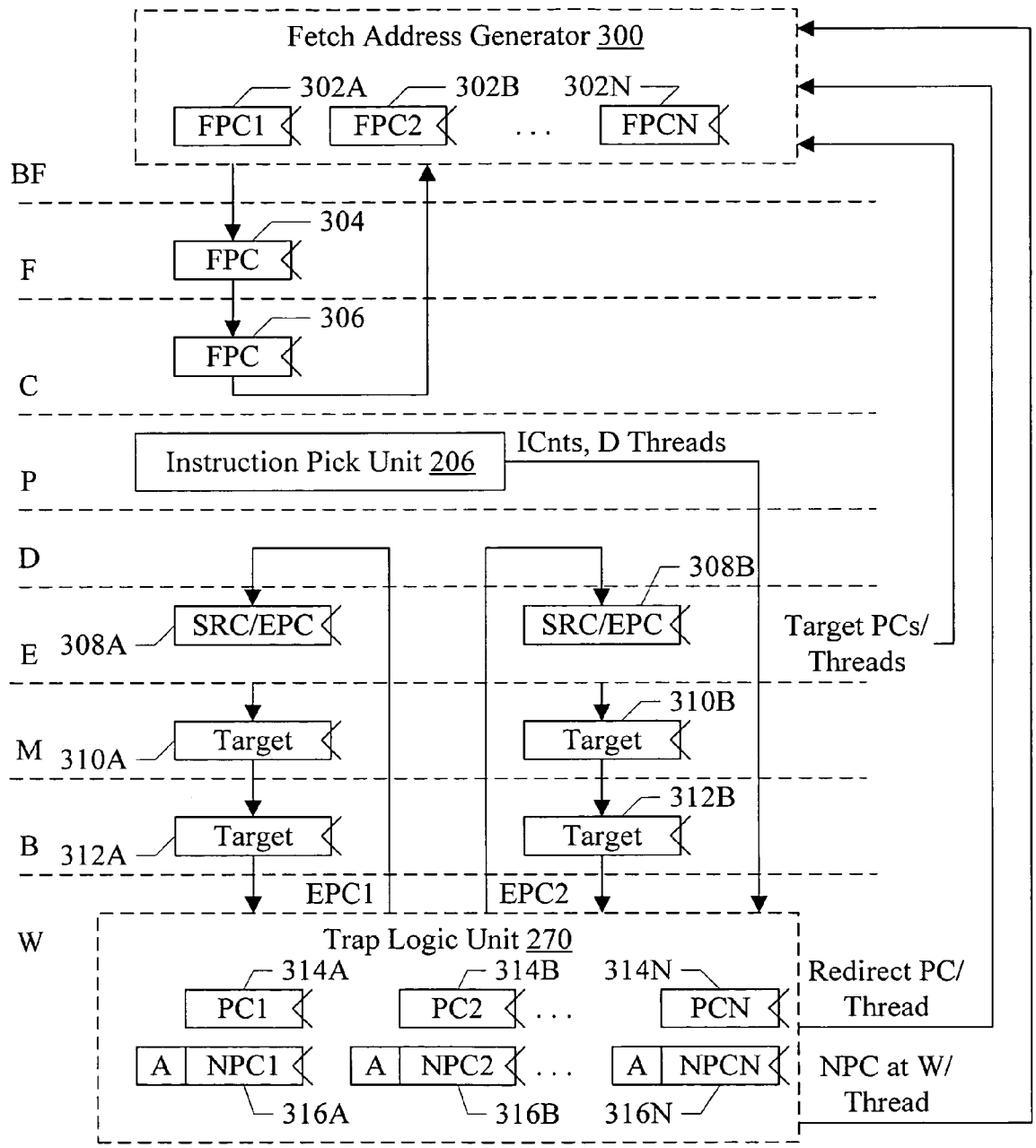
FIG. 4 is a block diagram illustrating one embodiment of a pipeline within one embodiment of a core and circuitry operable at various pipeline stages.

FIG. 4 is a block diagram illustrating one embodiment of a pipeline for one embodiment of a core 100, and illustrates various circuitry that may be operable at some of the pipeline stages for the illustrated embodiment. Generally, a circuit may be operable at a given pipeline stage if, for a given instruction, the circuit operates on the instruction when the instruction is in that given pipeline stage. In the embodiment of FIG. 4, the pipeline includes the fetch (F), cache (C), pick (P), decode (D), execute (E), memory (M), bypass (B), and writeback (W) stages shown in FIG. 3. Additionally a before fetch (BF) stage is also included in this embodiment. In the BF stage, one of the threads is picked to fetch from the instruction cache 204. During the F stage, the instruction cache 204 is accessed (along with the instruction TLB, if applicable). The remaining pipeline stages may be similar to those described above with respect to FIG. 3. In other embodiments, the pipeline of FIG. 3 may be used and the selection of threads may occur in the F stage.

FIG. 4 illustrates the management of PCs in the core 100. Particularly, in the illustrated embodiment, a fetch address generator circuit 300 is shown (including a set of storage devices 302A-302N). Generally, any sort of storage device may be used (e.g. flops, registers, latches, a memory array, etc.). Storage devices 304 and 306 are included at the fetch and cache stages, respectively. The storage device 304 is coupled to receive a fetch PC from the fetch address generator circuit 300, and the storage device 306 is coupled to receive a fetch PC from the storage device 304. Additionally, the storage device 306 is coupled to provide the fetch PC back to the fetch address generator circuit 300. This path may be used, e.g., for a cache miss, a TLB miss, or a fetch error (such as a parity error on the instruction cache 204). The instruction pick circuit 206 is shown. Additionally, storage devices 308A-308B are shown in the execute stage (corresponding to execution units 210A-210B, respectively). Storage devices 310A-310B are shown in the memory stage, and storage devices 312A-312B are shown in the bypass stage. Storage devices 310A-310B are coupled to receive target addresses from the execution units 210A-210B, respectively, and are coupled to the storage devices 312A-312B, respectively. The storage devices 312A-312B are coupled to the trap logic unit 270. The trap logic unit 270 includes storage devices 314A-314N, one for each thread, and also include storage devices 316A-316N, one for each thread. The trap logic unit 370 is coupled to provide execute PCs (EPC1 and EPC2) to the storage devices 308A-308B, and is coupled to receive instruction counts (ICnts) and an indication of the threads to which the instruction(s) in the D stage belong (D threads) from the instruction pick unit 206. The trap logic unit 270 is coupled to provide a redirect PC to the fetch address generator circuit 300, which is also coupled to receive target PCs from the execution units 210A-210B (illustrated as target PCs emanating from the execute stage in FIG. 4). The trap logic unit 270 is also coupled to provide an NPC at writeback (W) to the fetch address generator circuit 300.

The trap logic unit 270, operable at the writeback stage in this embodiment, is configured to manage the per-thread PCs. The trap logic unit 270 may use each of the storage devices 314A-314N to store a PC corresponding to a different thread. As instructions reach the writeback stage from either of the execution units 210A-210B, the trap logic unit 270 updates the storage device 314A-314N corresponding to the thread to which each instruction belongs. Each instruction may include, e.g., a thread tag that identifies the thread to which the instruction belongs.

In the present embodiment, the processor 10 implements the SPARC ISA (or any other ISA that specifies DCTIs). Thus, the trap logic unit 270 also tracks a per-thread NPC in the storage devices 316A-316N. As instructions reach the writeback stage, the trap logic unit 270 also updates the storage device 316A-316N corresponding to the thread to which each instruction belongs. Thus, there are a pair of PCs for each thread (the PC and the NPC) in the present embodiment. For many instructions, the PC may be updated by copying the current value of the NPC to the PC and incrementing the NPC to generate the new value of the NPC. However, DCTI instructions and delay slot instructions may be treated differently.

The DCTI calculates a target address, which is the NPC of the instruction in the delay slot if the DCTI is taken. A control transfer instruction is "taken" if the instruction flow is transferred to the target address of the control transfer instruction, and "not taken" if the instruction execution flow is not transferred to the target address (that is, instruction execution flow continues sequentially). If the DCTI completes without exception and is taken, the trap logic unit 270 in the present embodiment may update the NPC of the thread corresponding to the DCTI with the target address. Thus, until the delay slot instruction completes, the NPC may actually be ahead of the NPC corresponding to the most recently completed instruction (the instruction that has most recently passed the writeback stage). That is, the NPC is the NPC of the delay slot instruction, which has not yet completed. To record such situations, each of the storage devices 316A-316N includes an indication of whether or not the NPC is ahead (illustrated for this embodiment as the A bit). If the A bit is set, the NPC is ahead of the most recently completed instruction. If the A bit is clear, the NPC is not ahead. Other embodiments may assign the opposite meanings to the set and clear states.

In one embodiment, the PC may also be updated to be ahead of the most recently completed instruction if the NPC is ahead. Since the DCTI is known to completed without exception, the PC of the DCTI is not needed for exception purposes. By having the PC ahead when the NPC is ahead, the PC and the NPC may remain in sync (that is, the PC and the NPC may correspond to the same instruction, even if that instruction has not yet completed).

The SPARC ISA also includes the ability for a DCTI to annul its delay slot instruction. For embodiments implementing the SPARC ISA (or any other architecture that permits annulling of the delay slot instruction), the trap logic unit 270 may take into account whether or not the delay slot instruction is annulled when updating the PC and NPC at the completion of the DCTI. The PC and NPC may be adjusted to account for skipping the delay slot instruction in such cases. An exemplary embodiment is shown in FIG. 5 and described in more detail below.

The SPARC ISA also permits the delay slot instruction to itself be a DCTI. The behavior of a series of taken DCTIs, each in the delay slot of a previous DCTI, is to execute one instruction at the target of each DCTI before transferring to the target of the next taken DCTI. The above description of updating the NPC and PC to be the NPC and PC of the delay slot instruction is generally repeated for each DCTI. In each case of a taken DCTI that is in the delay slot of another taken DCTI, the NPC at the time such a taken delay slot DCTI completes is the target of the other DCTI, and may be moved to the PC upon completing the taken delay slot DCTI to keep the PC "ahead". The NPC may be updated to the target of the taken delay slot DCTI, thus keeping the NPC "ahead".

In one embodiment, the instruction pick unit 206 may not select a DCTI to be executed unless the delay slot instruction has been successfully fetched into the instruction buffer. Thus, if the DCTI completes without exception, and the delay slot instruction has been fetched without exception (or the fetch logic inserts a no op as the delay slot instruction, with an indication that an exception has occurred on fetching the delay slot instruction), then the delay slot instruction is known to be available for execution and thus the PC and NPC are known to be returned to a "not ahead" state (that is, to a precise state for the exception) at some point before an exception can occur for that thread.

The fetch address generator circuit 300 is operable at the BF stage, and maintains a fetch PC (FPC) for each thread. The fetch address generator circuit 300 includes a plurality of storage devices 302A-302N to store each of the fetch PCs. The fetch address generator circuit 300 selects a thread to fetch, and transmits the fetch PC to the fetch stage, which includes the storage device 304 to store the fetch PC. The fetch PC at the fetch stage may access the instruction cache 204 (and may access and detect hit/miss in the instruction TLB). The fetch PC is pipelined to the cache stage storage device 306 for comparing with the tags from the instruction cache 204 to detect cache hit/miss. Additionally, the storage device 306 is coupled to provide the fetch PC back to the fetch address generator circuit 300 as mentioned above. If a cache miss, TLB miss, fetch error, etc. is detected, the fetch address generator circuit 300 may update the fetch PC of the thread to the fetch PC from the storage device 306.

After the cache stage, the fetch PC is not pipelined any further in the illustrated embodiment. The instructions fetched from the instruction cache are written to the instruction buffers (not shown in FIG. 4) in the instruction pick unit 206 without the corresponding PCs. Thus, the pick stage and the decode stage exclude PCs, as do the memory stage and the bypass stage. The execute stage does include storage for an execute PC, or EPC (one per execution unit 210A-210B, shown as storage devices 308A and 308B, respectively). However, in the illustrated embodiment, the storage devices 308A-308B are also used for instructions that do not require the EPC to store a source operand.

The EPC is used by relative control transfer instructions as a source for calculating the target address. Thus, storage devices 310A-310B, at the memory stage, and storage devices 312A-312B, at the bypass stage, are used to pipeline the target address down to the writeback stage. However, the PC of the relative control transfer instruction is not needed, and thus the memory stage and bypass stages exclude the PC.

In the illustrated embodiment, the trap logic unit 270 generates an EPC for each of the execution units 210A-210B (shown as EPC1 and EPC2, respectively, in FIG. 4). The EPCs are provided as inputs to the storage devices 308A-308B. The instruction pick unit 206, in this embodiment, may track which threads correspond to the instructions in the pipeline stages between pick and writeback each clock cycle. For example, the instruction pick unit 206 may maintain a per-thread instruction count (ICnt). The instruction pick unit 206 may increment the instruction count for a thread in response to picking an instruction for that thread to be issued. The instruction pick unit 206 may decrement the instruction count for the thread when the instruction completes (at writeback, in this embodiment). In the present embodiment, there is no buffering of instructions or stalling of the pipeline after the pick stage. Accordingly, each instruction has a fixed latency from pick to writeback (except for a load instruction that misses the data cache 235). A load miss may be handled by flushing instructions from the thread and waiting for the load miss to complete before issuing from that thread again. In such an embodiment, the instruction pick unit 206 may decrement the instruction count for a thread when an instruction is known to reach writeback. In other embodiments, if buffering or stalling is permitted, the instruction pick unit 206 may receive feedback from the writeback stage indicating which threads have an instruction completing each clock cycle.

The instruction counts for each thread thus indicate the difference between the PC for the thread as maintained by the trap logic unit 270 and the EPC. The trap logic unit 270, dependent on whether or not the PC corresponding to a thread is ahead and dependent on the instruction count for the thread, may generate the PC for the instruction in the decode stage (and thus the instruction that will be entering the execute stage on the next clock cycle). The instruction pick unit 206 may indicate which threads correspond to the instruction(s) in the decode stage using the D threads indication.

The trap logic unit 270 may detect that a given thread is experiencing an exception/interrupt, and may transmit a redirect PC (and indication of the thread having the exception, such as a thread tag) to the fetch address generator circuit 300. Similarly, a taken control transfer instruction may result in a target PC being transmitted from the execution unit 210A-210B that executes the control transfer instruction (along with an indication of the tread, such as a thread tag). In either case, the fetch address generator circuit 300 updates the fetch PC of the identified thread with the supplied PC. Additionally, in the present embodiment, an instruction that has a data cache miss causes a flush of the thread that includes the instruction, and fetch is restarted with the instruction that follows the instruction with the data cache miss. Accordingly, when the instruction that has the data cache miss reaches writeback and updates the NPC of the thread, the trap logic unit 270 may provide the NPC to the fetch address generator circuit 300 (along with an indication of the thread for which the NPC is being provided). The fetch address generator circuit 300 may update the fetch PC of the thread with the NPC.

In some cases, a redirect from the trap logic unit 270 may occur on an instruction which has non-sequential PC and NPC values. In some embodiments, the PC may be transmitted as the redirect PC with an indication that only one instruction is to be executed. When the instruction is executed successfully, the NPC may be transmitted as the redirect PC.

It is noted that, while the "A" bit for each thread is shown as being stored in the storage devices 316A-316N, respectively, with the NPC for the thread, other embodiments may store the A bit in a separate storage device. It is further noted that, in other embodiments, ISAs may be implemented that do not specify DCTIs. Such embodiments may still implement the per-thread PC at one pipeline stage and derive PCs for other pipeline stages from the per-thread PC at that pipeline stage. Still further, other embodiments may not be multithreaded, but may still manage the PC at one pipeline stage and derive the PCs for other pipeline stages.

The present embodiment may permit one basic block per thread to be in the pipeline at a time. However, other embodiments are contemplated in which multiple basic blocks may be in the pipeline at the same time for the same thread. Such embodiments may maintain additional pairs of PCs at one pipeline stage (one pair for each basic block) and instructions may be marked to indicate which basic block they belong to (or transitions between basic blocks may be marked, if in-order execution is used). If the implemented ISA does not included DCTIs, the additional single PCs may be maintained to permit multiple basic blocks. In other embodiments, PCs may be maintained at more than one pipeline stage to handle multiple basic blocks. For example, there may be one set of PCs maintained at the E stage for one basic block, and another set of PCs at the W stage. A PC at the W stage for a given thread, in some cases, may be for a different basic block than the PC for the given thread at the E stage.

Turning next to FIG. 5, a truth table is shown illustrating operation of one embodiment of the trap logic unit 270 for managing PCs for a given thread. A heavy vertical line 320 divides the inputs in the truth table (to the left of the heavy vertical line 320) from the outputs of the truth table (to the right of the heavy vertical line 320). Labels for each column in the table are given at the top of the table, above a second heavy vertical line 322.

Particularly, in this embodiment, the inputs of the truth table include the current state of the A bit for a thread corresponding to an instruction that has reached writeback, along with the nature and status of the instruction itself. Particularly, inputs corresponding to the instruction that affect the next state include whether or not the instruction is a DCTI ("DCTI?" column), whether or not the DCTI is taken ("Taken?" column), whether or not the DCTI annuls its delay slot instruction ("Annul?" column), and whether or not the instruction has an exception ("Exception?" column). Don't cares in the inputs for a given row are illustrated with a "-". Outputs are the updates to the PC, the NPC, and the A bit for the thread corresponding to the instruction that has reached writeback. Where NPC and PC are used in the output columns of a given row, the table is referring to the current state of the NPC and PC (before the update indicated in that row). Additionally, the NPC may be updated to the target of the DCTI instruction, as piped down in the writeback stage from the execute stage, shown in the output column as "Target". It is noted that the "Annul?" column refers to whether or not the DCTI actually annuls the delay slot instruction, not the state of the annul bit in the branch instruction, for implementations of the SPARC ISA.

For example, the first row of the table refers to a non-DCTI instruction where the A bit is clear. Other columns are a don't care. In this case, the current NPC is copied to the PC, the NPC is incremented, and the A bit remains clear. On the other hand, a non-DCTI instruction occurring when the A bit is set (and thus the current PC and NPC values are ahead) is shown in the second row of the table, in which the PC and NPC are held constant and the A bit is cleared (and thus the most recently completed instruction has "caught up" to the PC and NPC in the trap logic unit 270).

Exceptions are a don't care for non-DCTI instructions, since the PC and NPC are still updated to reflect completion of the instruction having the exception. On the other hand, whether or not a DCTI has an exception does affect the next state of the PC and NPC, since the PC and NPC may get ahead when a DCTI completes without exception, but not if the DCTI has an exception. If the DCTI has an exception, the PC and the NPC are to be updated to the values corresponding to the DCTI itself (not "ahead" values, as occurs when a DCTI does not have an exception). Operation for a DCTI having an exception is shown in the last two rows of the truth table.

It is noted that some rows of the table may be implemented in other fashions. For example, the fourth row of the table (not taken DCTI that does not annul its delay slot instruction, and the A bit is set) can be implemented by holding the current state of the PC and NPC, and clearing the A bit. The sixth row of the table (not taken DCTI that annuls its delay slot instruction, and the A bit is set) can be implemented by updating the PC to the NPC, incremented the NPC, and clearing the A bit (similar to the first row of the table). For cases in which the DCTI annuls its delay slot instruction and does not have an exception, the PC may be viewed as a don't care and can be handled in any desired fashion. Additionally, it is noted that in the fifth, ninth, and tenth rows of the truth table, the PC and NPC are actually ahead in the output but the A bit is clear to account for the instruction that has been annulled from the delay slot.

It is noted that the truth table includes increments of various PCs by multiples of 4 (+4, +8, etc.). In this embodiment, instructions have a fixed length of four bytes. Other instruction sets may have instructions of different fixed lengths, and the increments may be multiples of that length. If a variable length instruction set is implemented, the increments may depend on the lengths of the particular instructions that are included in the instruction stream.

FIG. 6 shows an exemplary instruction sequence and the resulting values in the PC, NPC, and A bit for the thread as each instruction reaches writeback. On the left side in FIG. 6, the PC of the instruction and the instruction are shown. Non-DCTI instructions are denoted as I0, I1, I2, and I3. DCTIs are shown with their targets. None of the DCTI instructions annul in this example, and all DCTIs in this example are taken. On the right side in FIG. 6, underneath the brace labeled "TLU values for thread, when instruction reaches writeback", are the resulting PC, NPC, and A bit when the instruction completes.

The instruction I0, at address 1000, completes and updates the PC to 1000 and the NPC to 1004 (as shown in the first row of the truth table in FIG. 5). For this example, it is presumed that instructions have been executing sequentially up to address 1000. Thus, the state of the PC, NPC, and A bit prior to the instruction I0 completing is 9FC, 1000, and 0, respectively.

The DCTI at address 1004 reaches writeback next, and has a target address of 2000. Thus, the PC is updated to 1008 (NPC+4), the NPC is updated to 2000 (the target) and the A bit is set (as shown in the seventh row of the truth table). The second DCTI, at address 1008 and in the delay slot of the first DCTI, reaches writeback and updates the PC to 2000 (the NPC), the NPC to 3000 (the target) and keeps the A bit set (as shown in the eighth row of the truth table). The instruction flow proceeds to the third DCTI, at address 2000 and in the delay slot of the second DCTI. The third DCTI is similar to the second DCTI, and the eighth row of the truth table applies After the third DCTI, instruction flow proceeds to the instruction I1 at the target of the second DCTI. The second row in the truth table applies to instruction I1, and thus the PC and the NPC are held constant and the A bit is cleared. The instruction flow proceeds to instruction I2 at the target of the third DCTI, returning to sequential execution to instruction I3. The first row of the truth table applies to both instructions I2 and I3.

In other examples, a DCTI may not be taken. For example, if the first DCTI (at address 1004) was not taken, the update would be based on the third row of the truth table. Thus, the PC would be 1004, the NPC would be 1008, and the A bit would be clear. If the first DCTI was taken and the second DCTI was not taken, the fourth row of the truth table would apply to the second DCTI and the PC would be 2000, the NPC would be 2004, and the A bit would be set when the second DCTI reached the writeback stage.

In still other examples, a DCTI may annul its delay slot instruction. For example, if the first DCTI was to annul, then the ninth row of the truth table would apply and the PC would be 1004 (really a don't care in this case), the NPC would be 2000, and the A bit would be clear. If the first DCTI did not annul and the second DCTI was to annul, the tenth row of the truth table would apply to the second DCTI and the PC would be 1008, the NPC would be 3000, and the A bit would be clear when the second DCTI reached the writeback stage.

In yet other examples, a DCTI may be both not taken and annul its delay slot instruction. For example, if the first DCTI was not taken and annulled its delay slot instruction (the second DCTI), the fifth row of the truth table would apply and the PC would be 1008, the NPC would be 100C, and the A bit would be clear. If the first DCTI remained as shown in the example and the second DCTI were not taken and annulled its delay slot, the sixth row of the truth table would apply to the second DCTI and the PC would be 100C, the NPC would be 1010, and the A bit would be set when the second DCTI reached the writeback stage.

In still further examples, a DCTI may have an exception. In such cases, the eleventh or twelfth row of the truth table applies. For example, if the first DCTI had an exception, the eleventh row of the truth table would apply and the PC would be 1004, the NPC would be 1008, and the A bit would be clear. If the first DCTI was as shown in the example and the second DCTI had an exception, the twelfth of the truth table would apply to the second DCTI and the PC would be 1008, the NPC would be 2000, and the A bit would be clear when the second DCTI reached the writeback stage.

Figure 7:
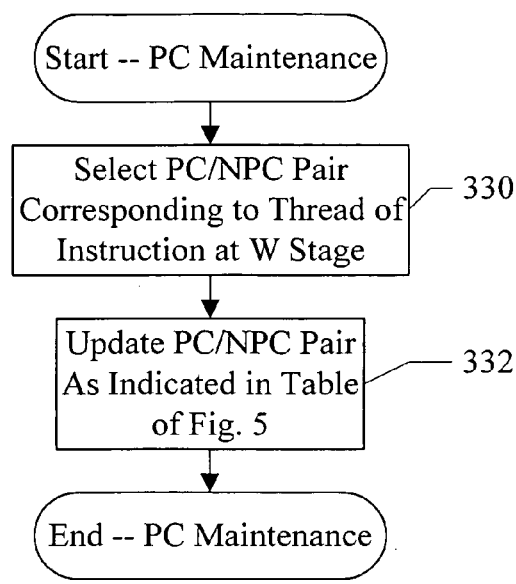
FIG. 7 is a flowchart illustrating operation of one embodiment of the trap logic unit for PC/NPC updates.

FIG. 7 is a flowchart illustrating operation of one embodiment of the trap logic unit 270 for maintaining PCs for threads at the writeback stage. The trap logic unit 270 may include circuitry which implements the operation shown in FIG. 7. More particularly, the trap logic unit 270 may include circuitry which performs the operation of FIG. 7 in parallel for each instruction that may concurrently reach the writeback stage, in some embodiments. In some embodiments, one or more of the blocks shown in the flowchart may be performed in parallel. In other embodiments, blocks may be pipelined over multiple cycles, as desired.

The trap logic unit 270 may select the PC/NPC pair from the storage devices 314A-314N and 316A-316N that corresponds to the thread of the instruction in the writeback stage (block 330). The trap logic unit 270 updates the PC/NPC pair (block 332). The updates may be as indicated in the truth table of FIG. 5.

Figure 8:
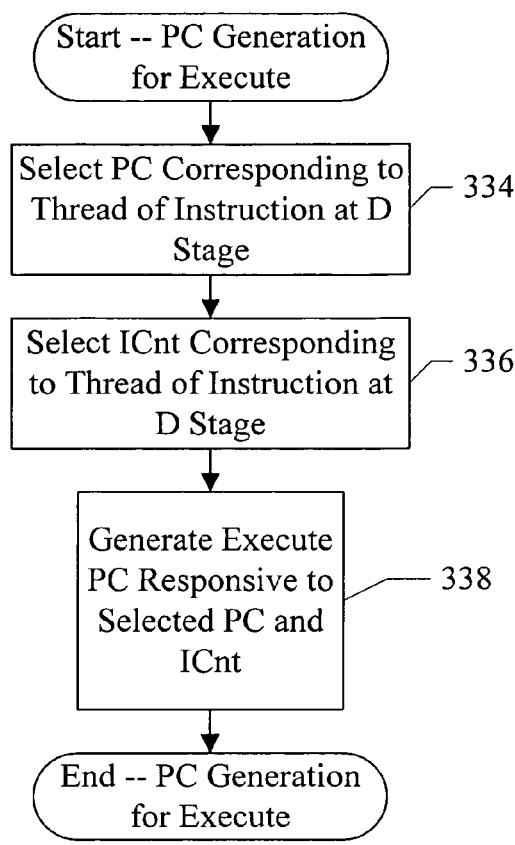
FIG. 8 is a flowchart illustrating operation of one embodiment of the trap logic unit for generating an execute PC.

FIG. 8 is a flowchart illustrating operation of one embodiment of the trap logic unit 270 for generating a PC for the execute stage (an EPC). The trap logic unit 270 may include circuitry which implements the operation shown in FIG. 8. More particularly, the trap logic unit 270 may include circuitry which performs the operation of FIG. 8 in parallel for each instruction that may concurrently reach the execute stage, in some embodiments. In some embodiments, one or more of the blocks shown in the flowchart may be performed in parallel. In other embodiments, blocks may be pipelined over multiple cycles, as desired.

The trap logic unit 270 may select the PC corresponding to the thread of the instruction at the D stage of the pipeline (that is, the stage prior to the execute stage, such that the instruction in that stage is entering the execute stage next) (block 334). Additionally, the trap logic unit 270 may select the instruction count (ICnt) provided by the instruction pick unit 206 that corresponds to the thread of the instruction at the D stage (block 336). As mentioned above, the thread of the instruction at the D stage may be identified by the instruction pick unit 206, via the D threads indication. Alternatively, the thread tag or other indicator from the D stage that is used to identify the thread of the instruction may be provided to the trap logic unit 270.

The trap logic unit 270 may generate the execute PC responsive to the selected PC and the instruction count (block 338). If the selected PC is not ahead (the corresponding A bit is clear), then the execute PC may be the sum of the selected PC, the instruction count (multiplied by the instruction length, which is 4 bytes in the SPARC ISA), and a constant of one instruction length (4, in this embodiment). If the selected PC is ahead (the corresponding A bit is set), the execute PC may be the sum of the selected PC and the instruction count (multiplied by the instruction length).

Figure 9:
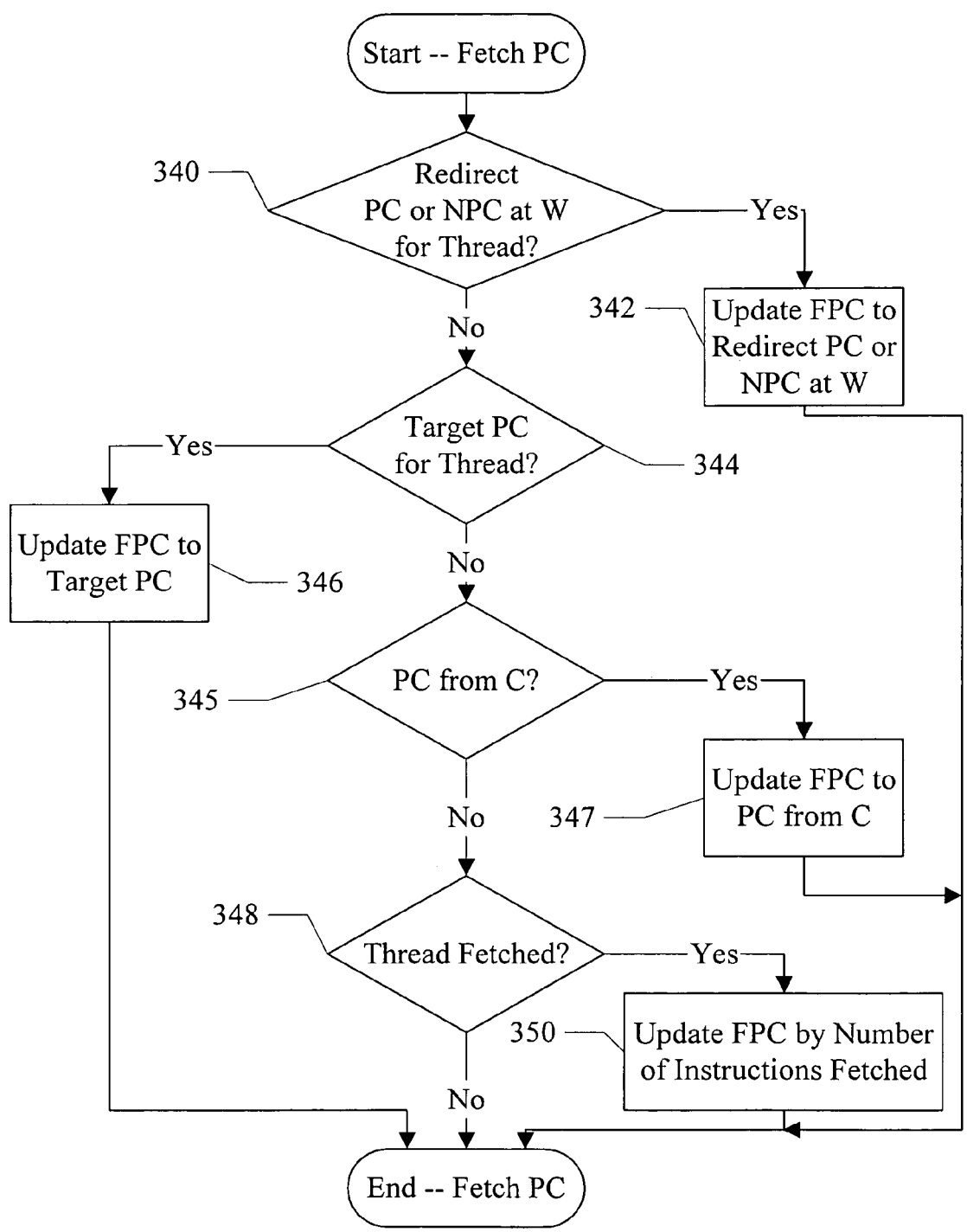
FIG. 9 is a flowchart illustrating operation of one embodiment of a fetch address generator.

Turning next to FIG. 9, a flowchart is shown illustrating operation of one embodiment of the fetch address generator circuit 300 for maintaining a fetch PC for a thread. The fetch address generator circuit 300 may include circuitry which implements the operation shown in FIG. 9. More particularly, the fetch address generator circuit 300 may include circuitry which performs the operation of FIG. 9 in parallel for each thread that may concurrently be in process in the core 100 (e.g. for each of 8 threads, in one implementation). In some embodiments, one or more of the blocks shown in the flowchart may be performed in parallel. In other embodiments, blocks may be pipelined over multiple cycles, as desired.

Generally, the fetch PC for a given thread may be updated if a redirect PC or NPC at W for the thread is provided, if a target PC is provided from the execution units 210A-210B, or if the thread has been selected for fetch. If more than one of the above events occurs concurrently, the redirect PC or NPC for data cache miss is the highest priority, followed by the target PC, followed by the PC from the C stage, followed by the update due to fetching.

The above prioritization is reflected by the order of the decision blocks in FIG. 9. In implementation, the various sources of update may be provided in parallel and the correct update source may be selected. For example, the sources of update may be provided to a multiplexor circuit, which may select the highest priority source for updating the fetch PC of the thread.

If a redirect PC or NPC at W for the thread is provided (decision block 340, "yes" leg), the fetch address generator circuit 300 updates the fetch PC of the thread to the redirect PC or the NPC at W (block 342). An NPC at W may be provided for a thread, e.g., in response to a data cache miss. If a target PC is provided from the execution units 210A-210B (decision block 344, "yes" leg), the fetch address generator circuit 300 updates the fetch PC of the thread to the target PC (block 346). If a PC is provided for the thread from the C stage (that is, the output of the storage device 306—decision block 345, "yes" leg), the fetch address generator circuit 300 updates the fetch PC of the thread to the PC from the C stage (block 347). If the thread has been selected to fetch instructions from the instruction cache 204 (decision block 348, "yes" leg), the fetch address generator circuit 300 updates the fetch PC of the thread to reflect the number of instructions fetched (block 350). For example, the fetch PC may be incremented by the number of instructions fetched (multiplied by the instruction length). If none of the above apply, the fetch PC for the thread may not be modified.

Exemplary System Embodiment

Figure 10:
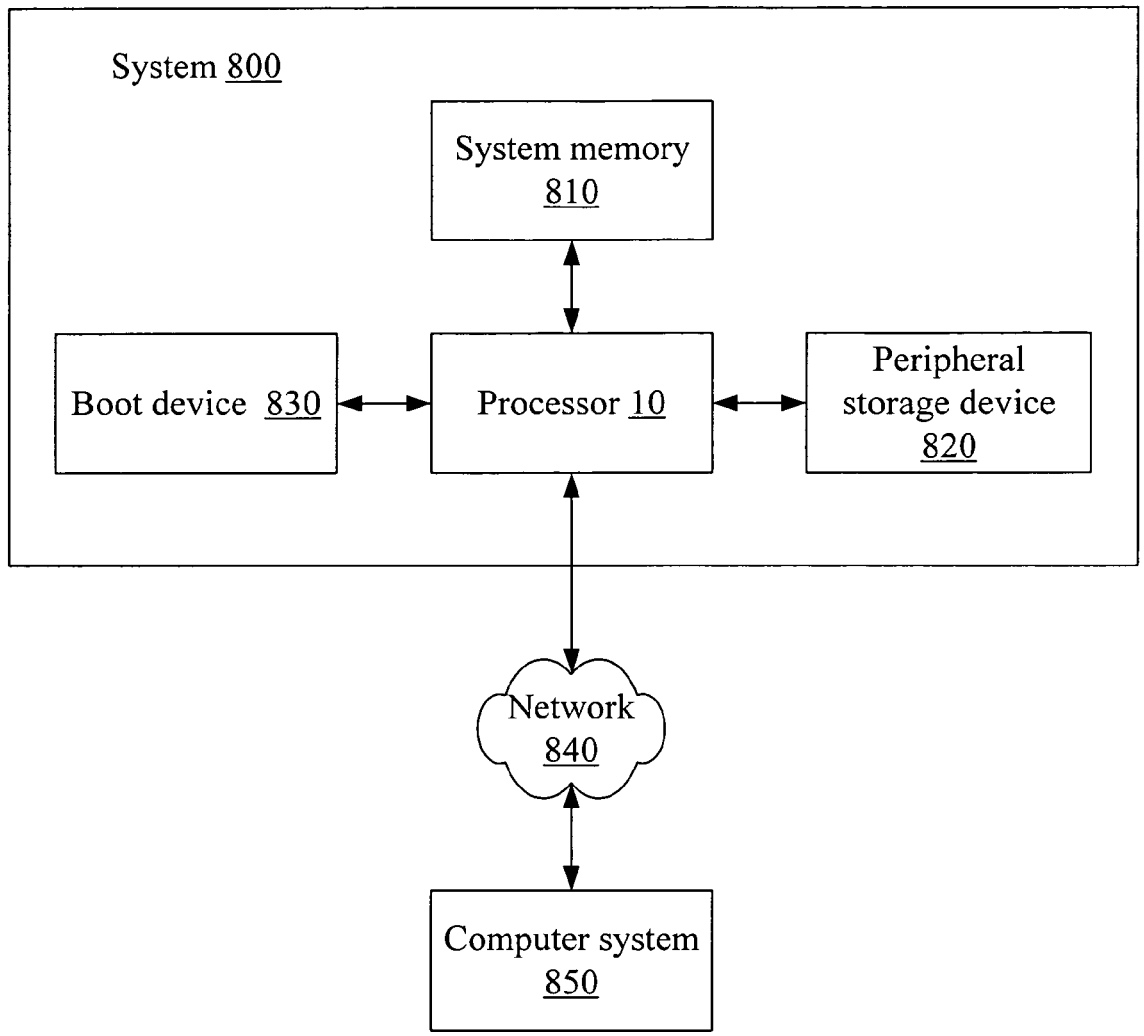
FIG. 10 is a block diagram of one embodiment of a system that may include one or more processors.

As described above, in some embodiments processor 10 of FIG. 1 may be configured to interface with a number of external devices. One embodiment of a system including processor 10 is illustrated in FIG. 10. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
   a plurality of pipeline stages; and
   a first circuit operable at a first pipeline stage of the plurality of pipeline stages, wherein the first pipeline stage is a stage at which instructions complete, and wherein the first circuit is configured to maintain a plurality of program counters (PCs), wherein each of the plurality of PCs corresponds to one of a plurality of threads that the processor is configured to have concurrently in process with respect to the plurality of pipeline stages, and wherein the first circuit is configured to update a given PC of the plurality of PCs responsive to each instruction that completes in the corresponding one of the plurality of threads, and wherein the first circuit is configured to provide a first PC to a second pipeline stage of the plurality of pipeline stages, wherein the first PC is derived from one of the plurality of PCs that corresponds to a first thread of the plurality of threads, and wherein a first instruction entering the second pipeline stage is from the first thread.

2. The processor as recited in claim 1 wherein the first PC is the PC of the first instruction.

3. The processor as recited in claim 1 wherein the second pipeline stage is an execute stage.

4. The processor as recited in claim 3 wherein the first instruction is a relative control transfer instruction, and wherein the first PC is used to calculate a target of the relative control transfer instruction.

5. The processor as recited in claim 4 wherein the relative control transfer instruction is a delayed relative control transfer instruction.

6. The processor as recited in claim 1 wherein a third pipeline stage of the plurality of pipeline stages is a pipeline stage at which a second plurality of PCs are maintained to fetch from the plurality of threads, each of the second plurality of PCs corresponding to a respective one of the plurality of threads.

7. The processor as recited in claim 6 wherein the first circuit is configured to provide a redirect PC generated for one of the plurality of threads due to a redirect on the one of the plurality of threads, and wherein the third stage is configured to update one of the second plurality of PCs that corresponds to the one of the plurality of threads for which the redirect occurs with the redirect PC.

8. The processor as recited in claim 6 wherein the first circuit is configured to provide a next PC generated for one of the plurality of threads due to a data cache miss for an instruction in the one of the plurality of threads, and wherein the third stage is configured to update one of the second plurality of PCs that corresponds to the one of the plurality of threads with the next PC, and wherein the next PC locates another instruction that follows the instruction having the data cache miss in the one of the plurality of threads.

9. The processor as recited in claim 6 further comprising at least one execution unit configured to execute instructions, wherein the execution unit is coupled to provide a target PC in response to executing a taken control transfer instruction, and wherein the third stage is configured to update one of the second plurality of PCs that corresponds to the one of the plurality of threads that includes the taken control transfer instruction with the target PC.

10. The processor as recited in claim 6 wherein the third stage is coupled to receive a fetch PC from a fourth stage of the plurality of pipeline stages in response to a cache miss, translation lookaside buffer miss, or fetch error, and wherein the third stage is configured to update one of the second plurality of PCs that corresponds to the one of the plurality of threads from which the fetch PC was generated with the fetch PC.

11. The processor as recited in claim 1 further comprising a second circuit operable at a third pipeline stage of the plurality of pipeline stages, wherein the first circuit is coupled to receive a plurality of instruction counts from the second circuit, and wherein each of the plurality of instruction counts corresponds to a respective one of the plurality of threads and is indicative of a number of instructions from the respective one of the plurality of threads that are in one or more of the plurality of pipeline stages, wherein the first circuit is configured to derive the first PC responsive to one of the plurality of instruction counts and one of the plurality of PCs.

12. The processor as recited in claim 1 wherein at least two of the plurality of PCs correspond to a first thread of the plurality of threads.

13. The processor as recited in claim 12 wherein a first PC of the at least two PCs is a PC of a most recent instruction from the first thread to reach the first pipeline stage for at least one instruction from the first thread.

14. The processor as recited in claim 13 wherein a second PC of the at least two PCs is a next PC of the most recent instruction from the first thread for at least one instruction from the first thread.

15. The processor as recited in claim 14 wherein the first PC is ahead of the PC of the most recent instruction from the first thread and the second PC is ahead of the next PC of the most recent instruction from the first thread for at least one other instruction from the first thread.

16. The processor as recited in claim 1 wherein at least one of the plurality of pipeline stages excludes a PC for the instruction in that pipeline stage.

17. In a processor that includes a plurality of pipeline stages, a method comprising:
   maintaining a plurality of program counters (PCs) at a first pipeline stage of the plurality of pipeline stages, wherein the first pipeline stage is a stage at which instructions complete, and wherein each of the plurality of PCs corresponds to one of a plurality of threads that the processor is configured to have concurrently in process with respect to the plurality of pipeline stages and wherein the maintaining comprises updating a given PC of the plurality of PCs responsive to each instruction that completes in the corresponding one of the plurality of threads;

deriving a first PC from one of the plurality of PCs that corresponds to a first thread of the plurality of threads; and providing the first PC to a second pipeline stage of the plurality of pipeline stages, wherein a first instruction entering the second pipeline stage is from the first thread.

18. The method as recited in claim 17 wherein the second pipeline stage is an execute stage.

19. The method as recited in claim 18 wherein the first instruction is a relative control transfer instruction, and wherein the method further comprises using the first PC to calculate a target of the relative control transfer instruction.

20. The method as recited in claim 19 wherein the relative control transfer instruction is a delayed relative control transfer instruction.

21. The method as recited in claim 17 further comprising maintaining a second plurality of PCs at a third pipeline stage of the plurality of pipeline stages, each of the second plurality of PCs corresponding to a respective one of the plurality of threads.

22. The method as recited in claim 21 further comprising:
providing a redirect PC generated for one of the plurality of threads due to a redirect on the one of the plurality of threads to the third pipeline stage; and
updating one of the second plurality of PCs that corresponds to the one of the plurality of threads for which the redirect occurs with the redirect PC.

23. The method as recited in claim 21 further comprising:
providing a next PC generated for one of the plurality of threads due to a data cache miss for an instruction in the one of the plurality of threads to the third stage, wherein the next PC locates another instruction that follows the instruction having the data cache miss in the one of the plurality of threads; and
updating one of the second plurality of PCs that corresponds to the one of the plurality of threads with the next PC.

24. The method as recited in claim 21 further comprising providing a target PC in response to executing a taken control transfer instruction in the one of the plurality of threads to the third stage; and
updating one of the second plurality of PCs that corresponds to the one of the plurality of threads that includes the taken control transfer instruction with the target PC.

25. The method as recited in claim 21 further comprising:
providing a fetch PC corresponding to one of the plurality of threads from a fourth stage of the plurality of pipeline stages in response to a cache miss, translation lookaside buffer miss, or fetch error; and
updating one of the second plurality of PCs that corresponds to the one of the plurality of threads from which the fetch PC was generated with the fetch PC.

26. The method as recited in claim 17 further comprising receiving a plurality of instruction counts, wherein each of the plurality of instruction counts corresponds to a respective one of the plurality of threads and is indicative of a number of instructions from the respective one of the plurality of threads that are in one or more of the plurality of pipeline stages, and wherein deriving the first PC is responsive to one of the plurality of instruction counts and one of the plurality of PCs.

27. The method as recited in claim 17 wherein at least two of the plurality of PCs correspond to a first thread of the plurality of threads.

28. The method as recited in claim 17 further comprising excluding a PC for an instruction in at least one of the plurality of pipeline stages.

29. A processor comprising:
a plurality of pipeline stages; and
a first circuit operable at a first pipeline stage of the plurality of pipeline stages, the first circuit configured to maintain at least one program counter (PC) corresponding to a thread being processed by the processor;
wherein at least one of the plurality of pipeline stages prior to an execute stage of the plurality of pipeline stages excludes a PC of the instruction in that pipeline stage; and
wherein a first instruction uses a first PC of the first instruction during execution, and wherein the first circuit is configured to derive the first PC for the first instruction and to supply the first PC to the execute pipeline stage for the first instruction.

30. The processor as recited in claim 29 wherein the processor is configured to concurrently process a plurality of threads, and wherein the first circuit is configured to maintain a plurality of PCs, wherein each PC corresponds to one of the plurality of threads.

* * * * *